(12) United States Patent
Lee et al.

(10) Patent No.: US 7,649,591 B2
(45) Date of Patent: Jan. 19, 2010

(54) OPTICAL MEMBER, METHOD OF FABRICATING THE SAME AND LIQUID CRYSTAL DISPLAY APPARATUS HAVING THE SAME

(75) Inventors: Jeong-Hwan Lee, Suwon-si (KR); Jae-Ho Jung, Giheung-eup-Yongin-si (KR); Sang-Hyuck Yoon, Seoul (KR); Jong-Dae Park, Seoul (KR); Kyu-Seok Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 71 days.

(21) Appl. No.: 12/117,536

(22) Filed: May 8, 2008

(65) Prior Publication Data
US 2008/0212331 A1 Sep. 4, 2008

Related U.S. Application Data

(63) Continuation of application No. 10/454,282, filed on Jun. 3, 2003, now Pat. No. 7,375,779.

(30) Foreign Application Priority Data
Oct. 5, 2002 (KR) .................. 10-2002-0060804

(51) Int. Cl.
*G02F 1/1335* (2006.01)
(52) U.S. Cl. ......................................... 349/65
(58) Field of Classification Search ............. 349/64–65
See application file for complete search history.

(56) References Cited
U.S. PATENT DOCUMENTS

| 4,002,426 A | 1/1977 | Chenevey et al. |
| 4,130,408 A | 12/1978 | Crossland et al. |
| 5,377,084 A | 12/1994 | Kojima et al. |
| 5,757,449 A | 5/1998 | Nishizaki et al. |
| 6,002,464 A | 12/1999 | Fujisawa et al. |
| 6,268,631 B1 | 7/2001 | Fukada et al. |
| 6,552,763 B1 | 4/2003 | Kouya |
| 6,741,303 B1 | 5/2004 | Okabe |
| 6,759,182 B2 | 7/2004 | Ikeda et al. |
| 6,771,335 B2 | 8/2004 | Kimura et al. |
| 2002/0033915 A1 | 3/2002 | Masaki et al. |
| 2002/0181111 A1 | 12/2002 | Okabe et al. |
| 2003/0002158 A1 | 1/2003 | Masaki et al. |
| 2003/0214717 A1 | 11/2003 | Kaminsky et al. |

FOREIGN PATENT DOCUMENTS

| JP | 05-196808 | 8/1993 |
| JP | 05-281539 A | 10/1993 |
| JP | 09-113709 A | 5/1997 |
| JP | 11-095013 A | 4/1999 |
| JP | 2002-062592 A | 2/2002 |
| JP | 2002-080621 A | 3/2002 |
| KR | 1020000055299 | 9/2000 |

*Primary Examiner*—David Nelms
*Assistant Examiner*—Phu Vu
(74) *Attorney, Agent, or Firm*—Innovation Counsel LLP (57) ABSTRACT

In an LCD apparatus having an optical member, the optical member has a base body having a light incident surface and a light emitting surface faced the light incident surface. A first resin layer is formed on the light emitting surface and a light diffusing pattern is uniformly formed on the first resin layer so as to diffuse a first light and emit a second light. Accordingly, the LCD apparatus can improve display quality and can be fabricated in low-cost manufacture. Also, since the light diffusing pattern is formed with a curable material, the light diffusing pattern can have various shapes and superior reproducibility.

16 Claims, 12 Drawing Sheets

OPTICAL MEMBER, METHOD OF FABRICATING THE SAME AND LIQUID CRYSTAL DISPLAY APPARATUS HAVING THE SAME

CROSS-REFERENCE TO RELATED APPLICATIONS

This application is a Continuation of U.S. patent application Ser. No. 10/454,282 filed on Jun. 3, 2003, now U.S. Pat. No. 7,375,779, which relies for priority upon Korean Patent Application No. 10-2002-60804, filed on Oct. 5, 2002, the contents of which are incorporated herein by reference in its entirety.

BACKGROUND OF THE INVENTION

1. Field of the Invention

The present invention relates to an optical member, a method of fabricating the same and an LCD (Liquid Crystal Display) apparatus having the same, and more particularly to an optical member that has high display quality and may be manufactured at a low-cost, a method of fabricating the same and an LCD apparatus having the same.

2. Description of the Related Art

In general, an LCD apparatus displays an image using a liquid crystal. A liquid crystal applied to an LCD apparatus has electrical property, for example, such as an arrangement is varied according to an electric field applied thereto and optical property, for example, such as light transmittance is varied according to the arrangement of the liquid crystal.

In order to display an image using a liquid crystal, an LCD apparatus includes a light supply module for generating light and a display module for changing the light emitted from the light supply module into image light having image information.

The LCD apparatus further includes a module for changing a light distribution of the light emitted from the light supply module or improving brightness of the light emitted from the light supply module. The module is disposed between the light supply module and the display module.

In detail, the module includes a light guide plate, a diffusion sheet and a prism sheet. The light guide plate changes the light distribution of a line light source emitted from the light supply module into a light distribution of a surface light source. The diffusion sheet is disposed on the light guide plate and allows the light emitted from the light guide plate to have a uniform brightness distribution. The diffusion sheet includes beads distributed on a transparent substrate so as to scatter or diffuse the light emitted from the light guide plate.

However, beads may be nonuniformly distributed on the diffusion sheet since beads are very minute. In case that beads are nonuniformly distributed, the brightness distribution of the light emitted from the diffusion sheet is not uniform, thereby deteriorating display quality of LCD apparatus.

BRIEF SUMMARY OF THE INVENTION

The present invention provides an optical member for generating light having a uniform brightness distribution.

Also, the present invention provides a method of fabricating the above optical member.

Also, the present invention provides an LCD apparatus having the above optical member.

In one aspect of the invention, an optical member includes a base body and a light diffusing layer formed on the base body.

The base body has a light incident surface for receiving a first light and a light emitting surface for emitting the first light, which faces the light incident surface. The light diffusing layer has a first resin layer disposed on the light emitting surface and a light diffusing pattern disposed on the first resin layer so as to diffuse the first light emitted from the light emitting surface and to emit a second light.

In another aspect of the invention, in a method of fabricating an optical member, a first resin layer is formed on a light emitting surface of a base body having a light incident surface for receiving a first light and the light emitting surface for emitting the first light, which faces the light incident surface. A light diffusing pattern having a hemispherical shape is formed on the first resin layer so as to diffuse the first light emitted from the light emitting surface and to emit a second light, the light diffusing pattern having a hemispherical shape. The first resin layer is cured through a curing process.

In further aspect of the invention, an LCD apparatus includes a light supply module for generating a first light, an optical member for diffusing the first light and emitting a second light and an LCD panel assembly for displaying an image using the second light.

The optical member includes a base body having a light incident surface for receiving the first light and a light emitting surface facing the light incident surface, a first resin layer formed on the light emitting surface, and a light diffusing layer having a light diffusing pattern formed on the first resin layer, for diffusing the first light emitted from the light emitting surface and emitting a second light.

According to the present invention, the light diffusing pattern formed on the optical member changes a light having a nonuniform brightness distribution into a light having a uniform brightness distribution. Thus, the LCD apparatus having the optical member can improve display quality and can be fabricated at a low-cost since the optical member does not need beads.

Also, since the light diffusing pattern is formed with a curable material, the light diffusing pattern can have various shapes and superior reproducibility.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
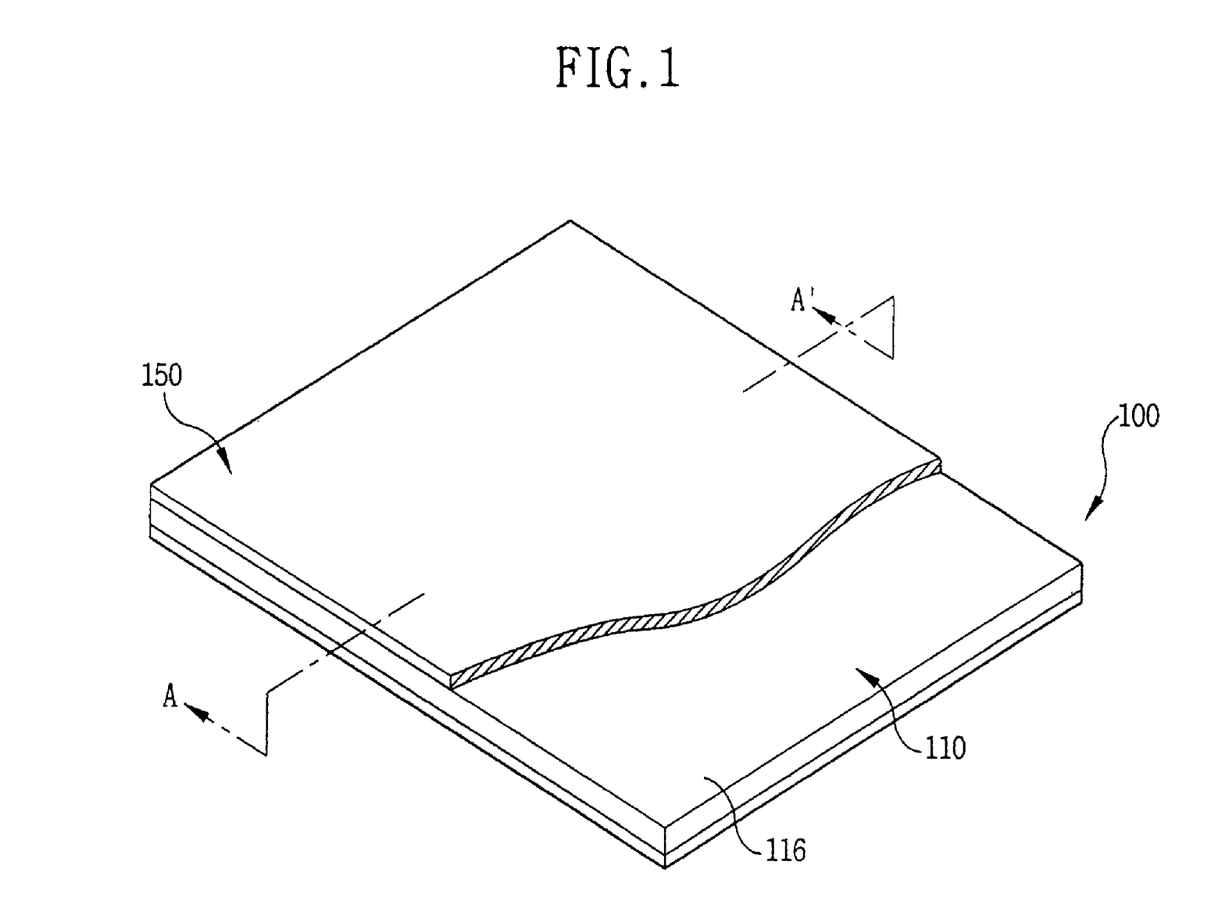
FIG. 1 is a perspective view showing an optical member according to an exemplary embodiment of the present invention.

FIG. 1 is a perspective view showing an optical member according to an exemplary embodiment of the present invention.

Referring to FIG. 1, an optical member 100 includes an optical sheet that changes light having a nonuniform brightness distribution into light having a uniform brightness distribution. For this purpose, the optical member 100 includes a base body 110 and a light diffusing layer 150.

The base body 110 has a shape of a rectangular plate or a rectangular sheet having a length longer than a width thereof and comprises polyester having a high light transmittance.

Figure 2A:
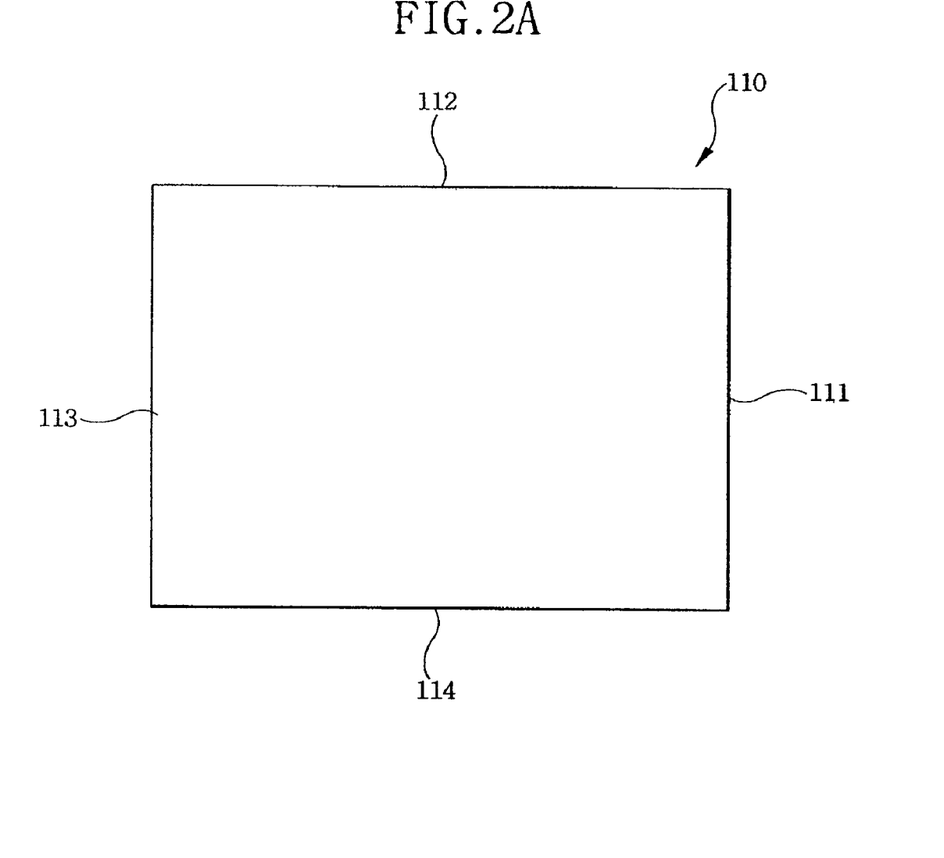
FIGS. 2A and 2B are views showing a base body shown in FIG. 1.
Figure 2B:
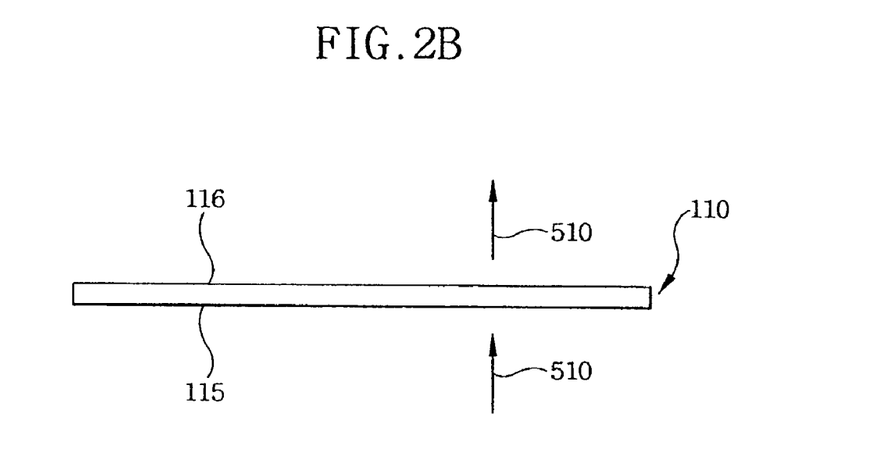

FIG. 2A is a plan view showing the base body 110 shown in FIG. 1, and FIG. 2B is a sectional view showing the base body 110 shown in FIG. 1.

Referring to FIGS. 2A and 2B, the base body 110 includes a first surface 111, a second surface 112, a third surface 113, a fourth surface 114, a light incident surface 115 and a light emitting surface 116.

Particularly, the first and second surfaces 111 and 112 face the third and fourth surfaces 113 and 114, respectively, and the light incident surface 115 faces the light emitting surface 116. The first to fourth surfaces 111, 112, 113 and 114 are connected between the light incident surface 115 and the light emitting surface 116. The base body 110 has high light transmittance so as to emit a first light 510 that is incident through the light incident surface 115 without changing optical properties of the first light 510.

The base body 110 may have various shapes in association with an installation position of a light source (not shown) that emits the first light 510. The base body 110 may be deformed by heat generated from the light source (not shown) and the heat generated from the light source (not shown) may cause wrinkle on the base body 110. As a result, the base body 110 wrinkled by the heat deteriorates display quality of the LCD apparatus.

Figure 3A:
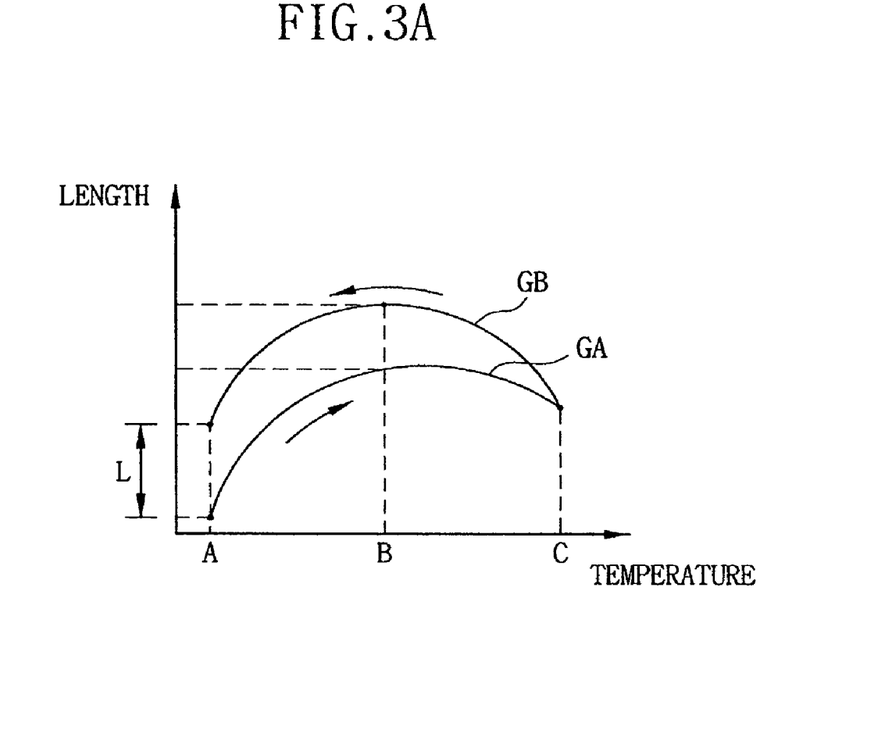
FIGS. 3A and 3B are graphs showing heat properties of a base body shown in FIG. 1.
Figure 3B:
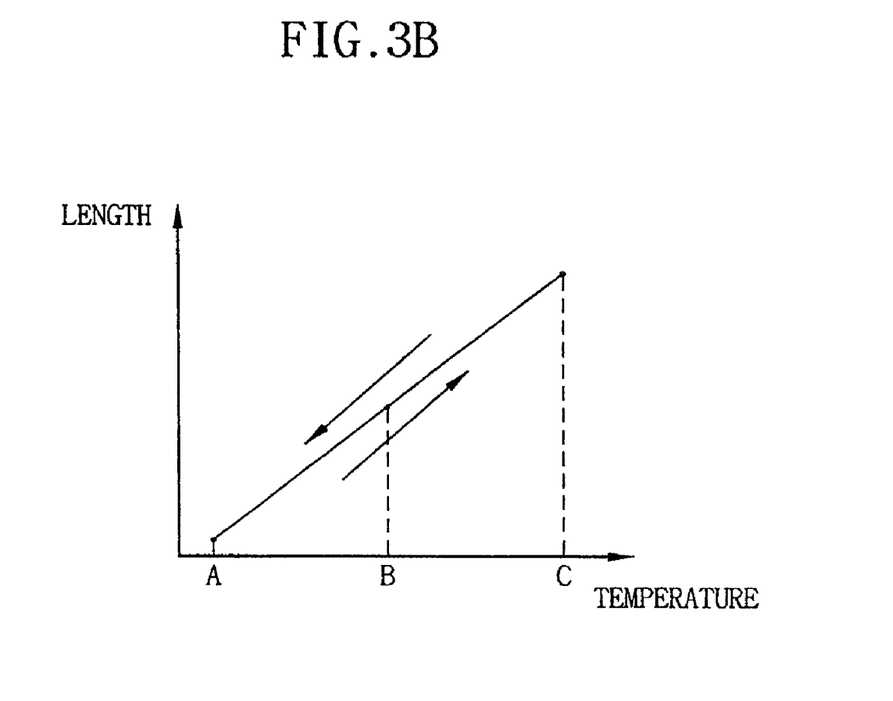

FIGS. 3A and 3B are graphs showing heat properties of the base body 110 shown in FIG. 1.

In FIG. 3A, a graph GA represents a length variation of the base body 110 while the base body 110 is heated and a graph GB represents a length variation of the base body 110 while the base body 110 is cooled.

As shown in FIG. 3A, when the base body 110 is successively heated from temperature "A" to temperature "B", the base body 110 is expanded along the graph GA as represented in quadratic curve. The base body 110 is successively expanded while the temperature "A" reaches the temperature "B" and contracted while the temperature "B" reaches temperature "C" even though the temperature "B" rises to the temperature "C", so the expanded length of the base body 110 is longest at the temperature "B".

When the base body 110 is successively cooled from the temperature "C" to the temperature "A", the base body 110 has a length different from a length before the base body 110 is heated. The difference between the expanded length and the contracted length of the base body 110 is as shown in reference numeral "L" of FIG. 3A. This means that the base body 110 is permanently deformed when the temperature applied to the base body 110 exceeds a specified temperature.

Recently, a length of lamp applied to an LCD apparatus and a light amount thereof gradually increases according to a scaled-up size of the LCD apparatus. As a result, a heat amount generated from the lamp increases, so that the base body 110 applied to the LCD apparatus may be wrinkled due to the increased heat amount generated from the lamp.

Referring to FIG. 3B, when the heat-treated base body 110 is successively heated from the temperature "A" to the temperature "C", the base body 110 is expanded in proportion to the temperature raised from the temperature "A" to the temperature "C". On the contrary, when the heat-treated base body 110 is cooled from the temperature "C" to the temperature "A", the length of the base body 110 returns to an initial state before the base body 110 is heated. That is, the expanded length of the base body 110 is identical to the contracted length of the base body 110.

The heat-treated base body 110 that comprises polyester does not wrinkle by the heat generated from the lamp, thereby preventing the deterioration of display quality of the LCD apparatus. As shown in FIG. 1, the light diffusing layer 150 is disposed on the heat-treated base body 110.

Figure 4:
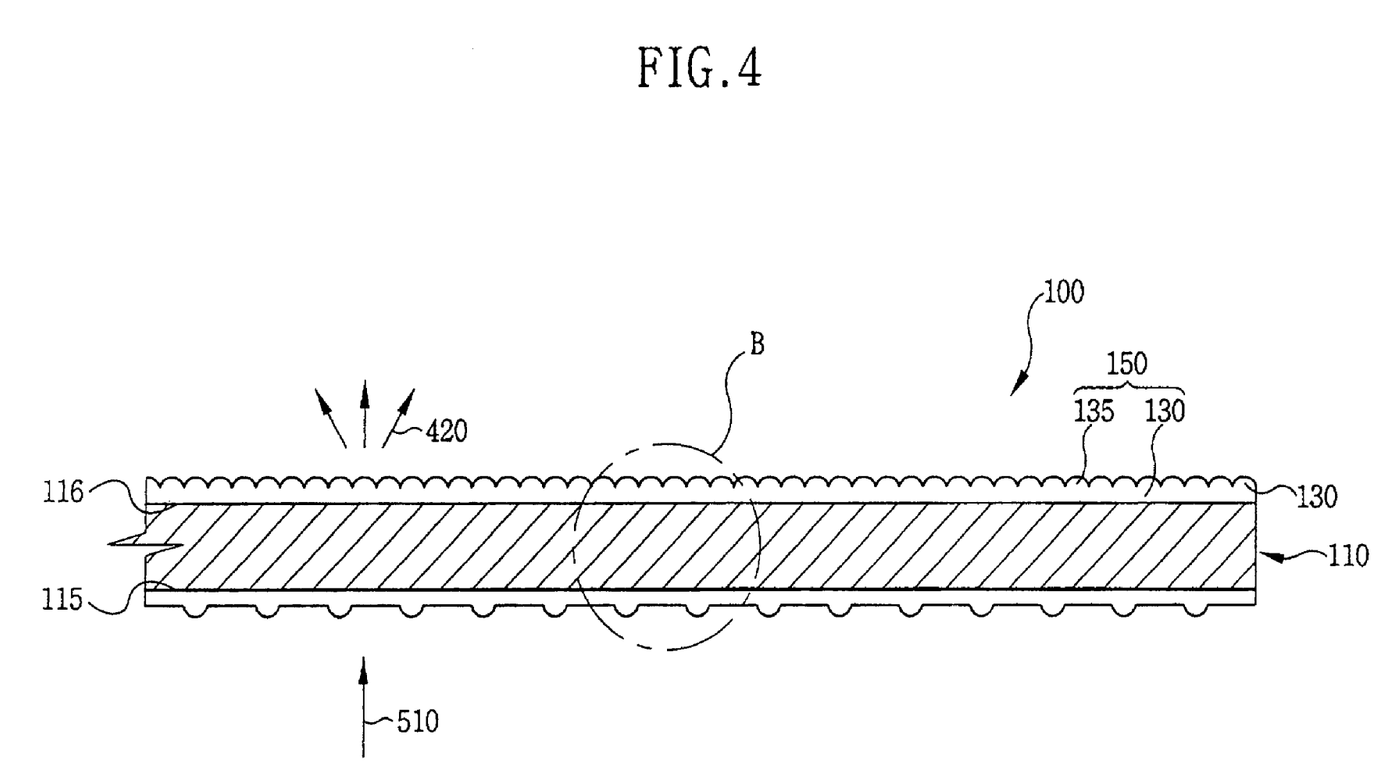
FIG. 4 is a cross-sectional view taken along the lines A-A' for showing an optical member shown in FIG. 1.
Figure 5:
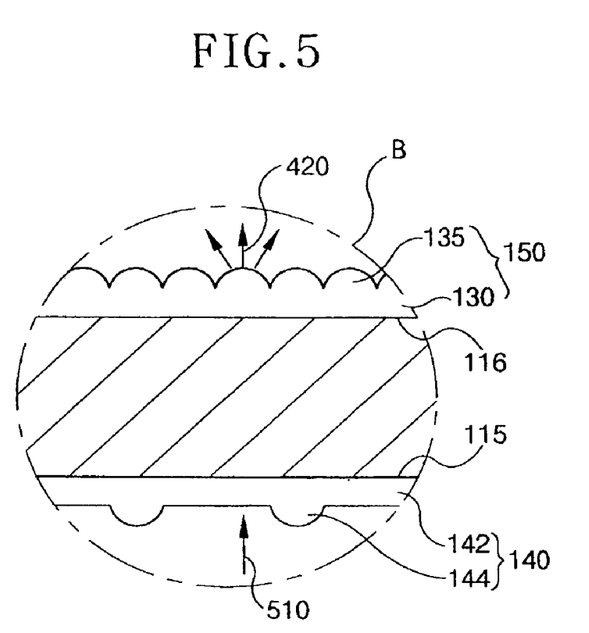
FIG. 5 is a partially enlarged view showing a portion "B" in FIG. 4.

FIG. 4 is a cross-sectional view taken along the lines A-A for showing an optical member shown in FIG. 1, and FIG. 5 is a partially enlarged view showing a portion "B" shown in FIG. 4.

Referring to FIGS. 4 and 5, the light diffusing layer 150 is disposed on the light emitting surface 116 of the base body 110. The light diffusing layer 150 includes a first resin layer 130 and a light diffusing pattern 135.

The first resin layer 130 may be comprised of a curable material that is gradually cured in accordance with the passage of time or rapidly cured under a specified condition.

In this exemplary embodiment, the first resin layer 130 is rapidly cured under the specified condition. That is, the first resin layer 130 is cured by exposure to ultraviolet rays, so the first resin layer 130 includes an ultraviolet-curable material.

Also, an expansion ratio and a contraction ratio of the first resin layer 130 are identical to those of the heat-treated base body 110 as described above. If the expansion ratio and contraction ratio of the first resin layer 130 are not identical to those of the heat-treated base body 110, the first resin layer 130 attached on the heat-treated base body 110 may be cracked or torn while the heat-treated base body 110 is expanded or contracted by the heat generated from the lamp.

Figure 6:
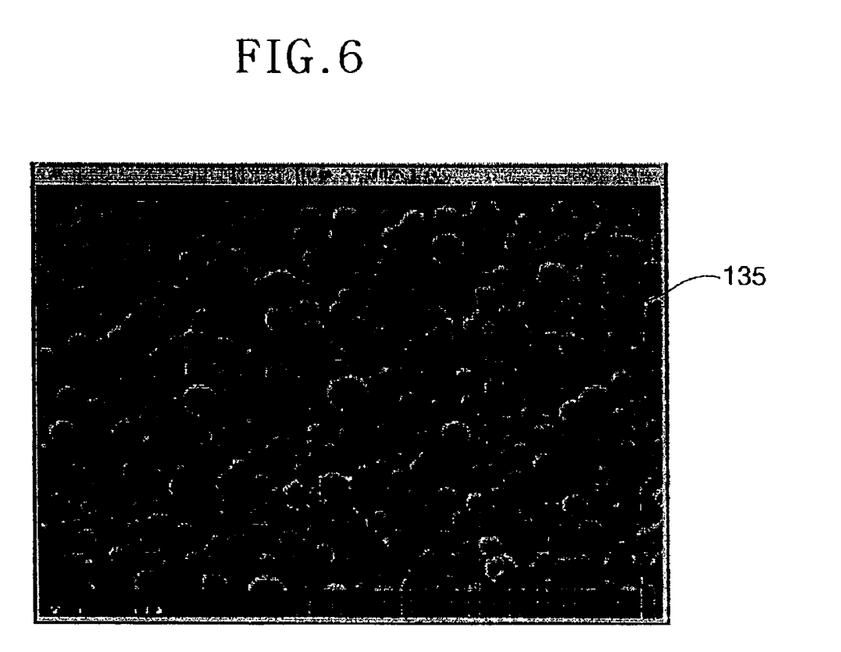
FIG. 6 is a scanning-electron-microscopy (SEM) specimen showing a light diffusing pattern according to an exemplary embodiment of the present invention.

FIG. 6 is a scanning-electron-microscopy (SEM) specimen showing a light diffusing pattern according to an exemplary embodiment of the present invention.

Referring to FIG. 6, the light diffusing pattern 135 is formed on a surface of the first resin layer 130 by using a stamp method.

The light diffusing pattern 135 has a hemispherical shape uniformly formed on the surface of the first resin layer 130. The first light 510 passing through the base body 110 reaches the light diffusing pattern 135 and is diffused while passing through a spherical surface of the light diffusing pattern 135. Hereinafter, the first light 510 diffused by the light diffusing pattern 135 is defined as a second light 420.

In this exemplary embodiment, with consideration for using the stamp method so as to form the light diffusing pattern 135, the light diffusing pattern 135 may have various shapes, for example, such as a convex pyramid, a concave hemisphere or a concave pyramid.

As shown in FIG. 5, the optical member 100 further includes a layer 140 having a second resin layer 142 disposed on the light incident surface 115 and a protrusion 144 disposed on the second resin layer 142 so as to prevent the second resin layer 142 from making contact with a member adjacent to the optical member 100.

The second resin layer 142 is comprised of the curable material that is gradually cured in accordance with the passage of time or rapidly cured under the specified condition. In this exemplary embodiment, the second resin layer 142 includes the ultraviolet-curable material so as to be cured by exposure to ultraviolet rays.

Also, an expansion ratio and a contraction ratio of the second resin layer 142 are identical to those of the heat-treated base body 110. If the expansion ratio and contraction ratio of the second resin layer 142 are not identical to those of the heat-treated base body 110, the second resin layer 142 attached on the heat-treated base body 110 may be cracked or torn while the heat-treated base body 110 is expanded or contracted by the heat generated from the lamp.

Furthermore, an expansion ratio and a contraction ratio of the second resin layer 142 are identical to those of the first resin layer 130. If the expansion ratio and contraction ratio of the second resin layer 142 are not identical to those of the first resin layer 130, the base body 110 may be bent due to differences of the expansion and contraction ratios between the first and second resin layers 130 and 142 while the base body 110 is expanded or contracted.

The protrusion 144 is formed on a surface of the second resin layer 142 in a matrix configuration and protruded from the surface of the second resin layer 142. The protrusion 144 may have various shapes, for example, such as a hemispherical shape and a polygonal shape since the protrusion 144 is formed using the stamp method.

Hereinafter, a method of fabricating the optical member according to an exemplary embodiment of the present invention will be illustrated with reference to the accompanying drawings.

FIGS. 7A to 7D are views for illustrating a method of fabricating an optical member according to an exemplary embodiment of the present invention.

Figure 7A:
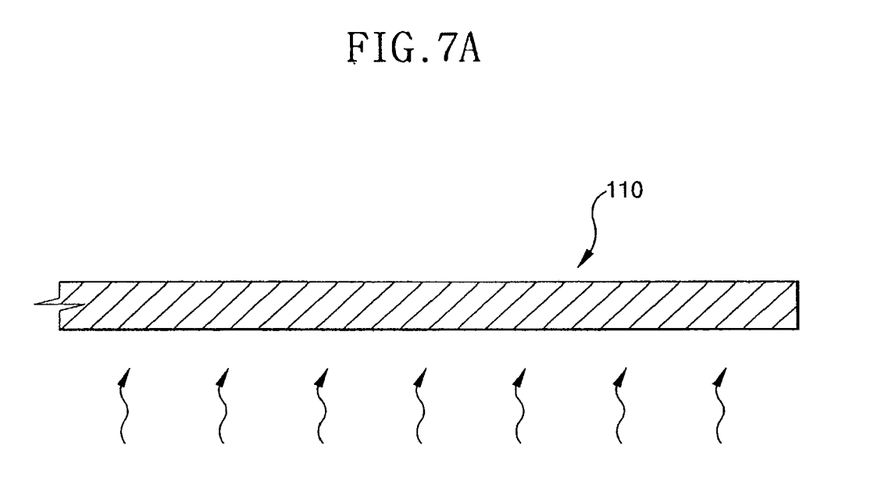
FIGS. 7A to 7D are views for illustrating a method of fabricating an optical member according to an exemplary embodiment of the present invention.

Referring to FIG. 7A, the base body 110 is selectively heat-treated according to a material contained into the base body 110 before forming the first resin layer 130 (see FIG. 7B) thereon. That is, the heat treatment with respect to the base body 110 is selectively performed when the expansion ratio and the contraction ratio are not identical to each other.

Figure 7B:
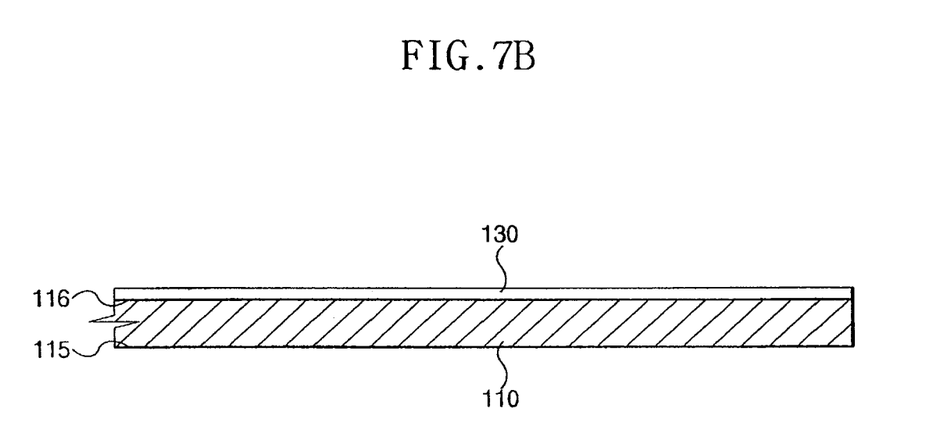

Referring to FIG. 7B, the first resin layer 130 is formed on the light emitting surface 116 of the base body 110 in a thin film. In this exemplary embodiment, the first resin layer 130 includes the curable material cured by exposure to the ultraviolet rays.

Figure 7C:
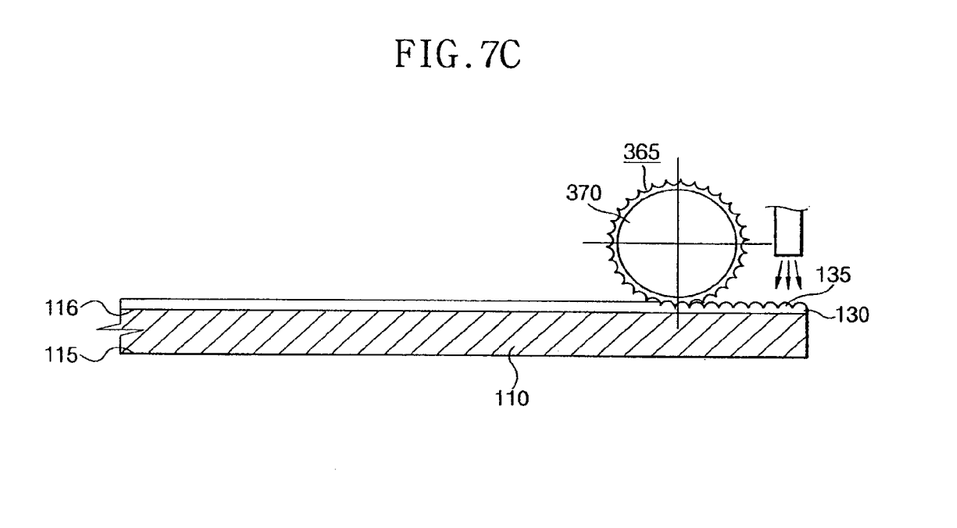

Referring to FIG. 7C, a first roller 370, on which a first transfer pattern 130 having a hemispherical shape that is reversed with respect to the light diffusing pattern 135 (see FIG. 4) is formed, is disposed on the first resin layer 130. The first roller 370 is rolled along the surface of the first resin layer 130 so as to form the light diffusing pattern 135 on the first resin layer 130. After the light diffusing pattern 135 is formed on the first resin layer 130 by rolling the first roller 370, the first resin layer 130 and the light diffusing pattern 135 formed on the first resin layer are exposed to the ultraviolet rays, thereby curing the first resin layer 130 and the light diffusing pattern 135.

Figure 7D:
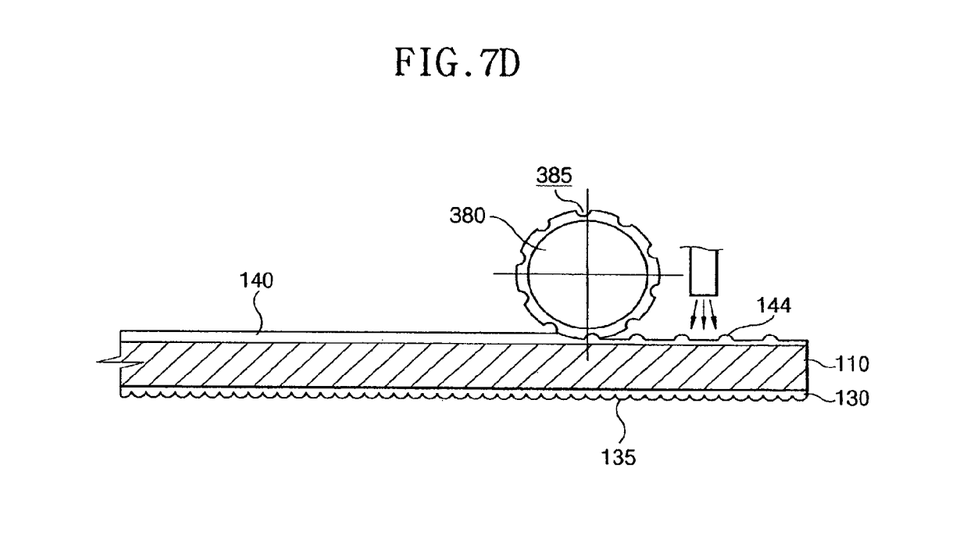

Referring to FIG. 7D, after curing the first resin layer 130 and the light diffusing pattern 135, the second resin layer 140 having the curable material cured by exposure to the ultraviolet rays is formed on the light incident surface 115 of the base body 110. A second roller 380, on which a second transfer pattern 385 having a reversed shape with respect to the protrusion 144 is formed, is disposed on the second resin layer 140. The second roller 380 is rolled along the surface of the second resin layer 140 so as to form the protrusion 144 on the surface of the second resin layer 140, thereby preventing the base body 110 from making contact with a member adjacent to the base body 110, for example, such as a light guide plate (not shown). The second resin layer 140 and the protrusion 144 are cured by exposure to the ultraviolet rays.

Figure 8A:
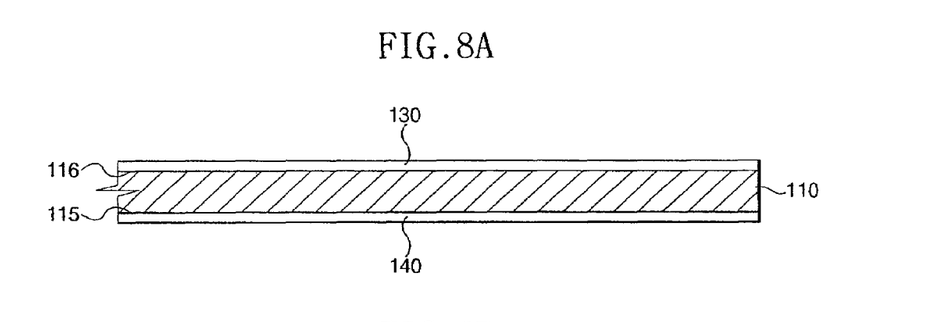
FIGS. 8A to 8C are views for illustrating a method of fabricating an optical member according to another exemplary embodiment of the present invention.
Figure 8B:
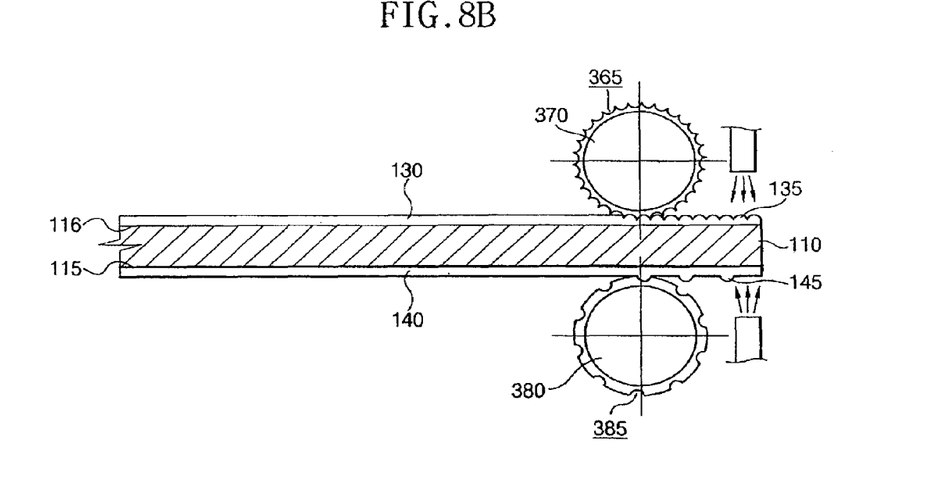
Figure 8C:
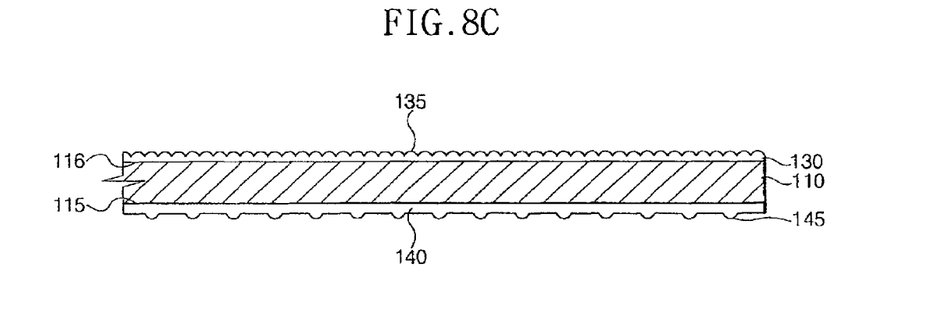

FIGS. 8A to 8C are views for illustrating a method of fabricating an optical member according to another exemplary embodiment of the present invention.

Referring to FIG. 8A, a first resin layer 130 is formed on a light emitting surface 116 of a base body 110 and a second resin layer 140 is formed on a light incident surface 115. In this exemplary embodiment, the first and second resin layers 130 and 140 include a curable material cured by exposure to an ultraviolet rays.

Referring to FIGS. 8B and 8C, a first roller 370 is disposed on the first resin layer 130 and a second roller 380 is disposed on the second resin layer 140.

The first roller 370 includes a first transfer pattern 375 which is closely formed on the first rolled 370 and the second roller 380 includes a second transfer pattern 385 which is separated from each other in a predetermined distance. The first and second transfer patterns 375 and 385 has a hemispherical shape that is reversed with respect to a light diffusing pattern 135 and a protrusion 145, respectively (see FIG. 8C).

The first roller 370 is rolled along a surface of the first resin layer 130 so as to form the light diffusing pattern 135 on the first resin layer 130 and the second roller 380 is rolled along a surface of the second resin layer 140 so as to form the protrusion 145 on the second resin layer 140, respectively. The light diffusing pattern 135 and the protrusion 145 may be formed by transferring the base body 110 to be passed between the first and second rollers 370 and 380.

After the light diffusing pattern 135 and the protrusion 145 are formed on the first and second resin layers 130 and 140, respectively, the first resin layer 130 and the second resin layer 140 are exposed to the ultraviolet rays, so the first resin layer 130 on which the light diffusing pattern 135 is formed and the second resin layer 140 on which the protrusion 145 is formed are cured.

Hereinafter, a method of fabricating a roller according to an exemplary embodiment of the present invention will be described with reference to the accompanying drawings.

FIGS. 9A to 9E are views for illustrating a method of manufacturing a roller according to an exemplary embodiment of the present invention.

Figure 9A:
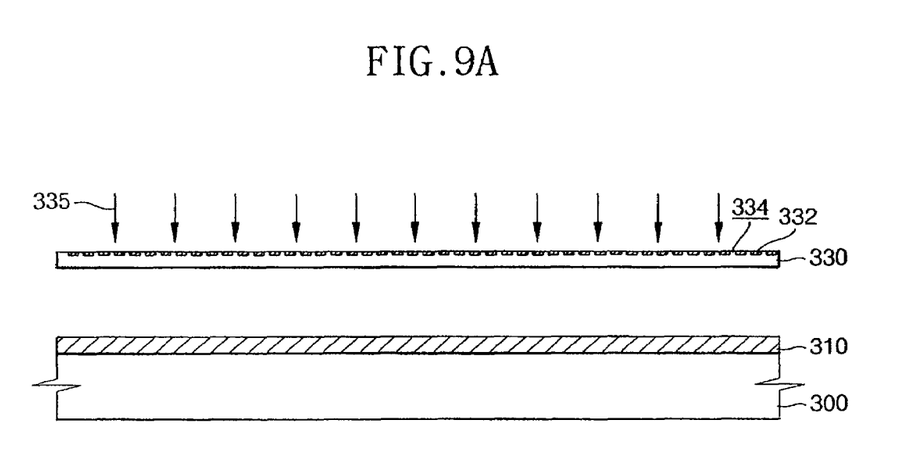
FIGS. 9A to 9E are views for illustrating a method of manufacturing a roller according to an exemplary embodiment of the present invention.

Referring to FIG. 9A, a first photoresist layer 310 is coated on a first substrate 300 by using a spin coating method.

Then, a pattern mask 330 is aligned with the first photoresist layer 310. The pattern mask 330 includes a chrome layer 332 that is partially opened corresponding to positions on which a light diffusing pattern (not shown) is formed. A light 335 is provided to the pattern mask 330 aligned with the first photoresist layer 310.

The light 335 provided to the pattern mask 330 is supplied to the first photoresist layer 310 passing through the opening portion 334 of the chrome layer 332 so as to partially expose the first photoresist layer 310.

Figure 9B:
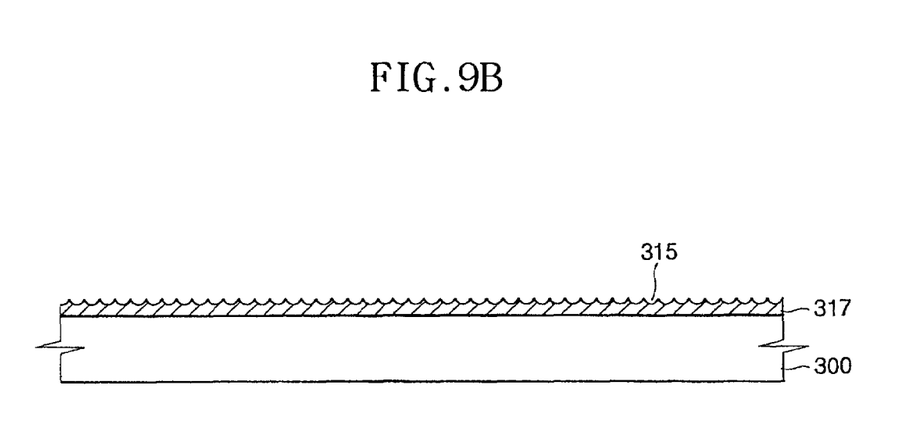

Referring to FIG. 9B, partially exposed portions of the first photoresist layer 310 by the light 335 supplied through the pattern mask 330 is removed through a developing process, thereby forming a second photoresist layer 317 on which a first pattern 315 having size identical to and shape that is reversed with respect to that of the light diffusing pattern 135 is formed.

Figure 9C:
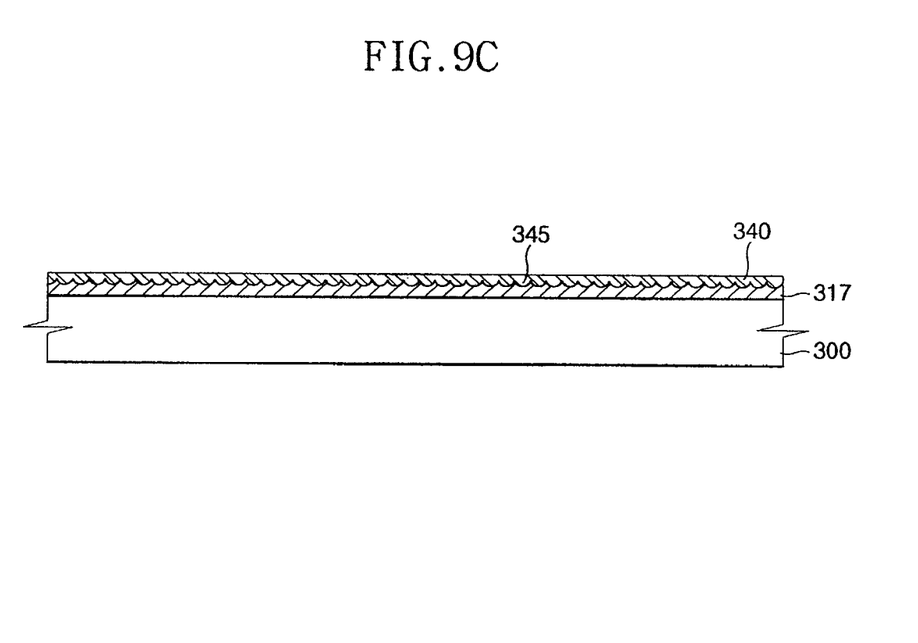

Referring to FIG. 9C, a metal layer 340 is formed on the second photoresist layer 317 by using a sputtering method, on which the first pattern 315 is formed. The metal layer 340 has a second pattern 345 having size and shape identical to those of the light diffusing pattern 135 by means of the first pattern 315 of the second photoresist layer 317.

The second photoresist layer 317 formed under the metal layer 340 is removed through an ashing process and the metal layer 340 is separated from the second photoresist layer 317.

Figure 9D:
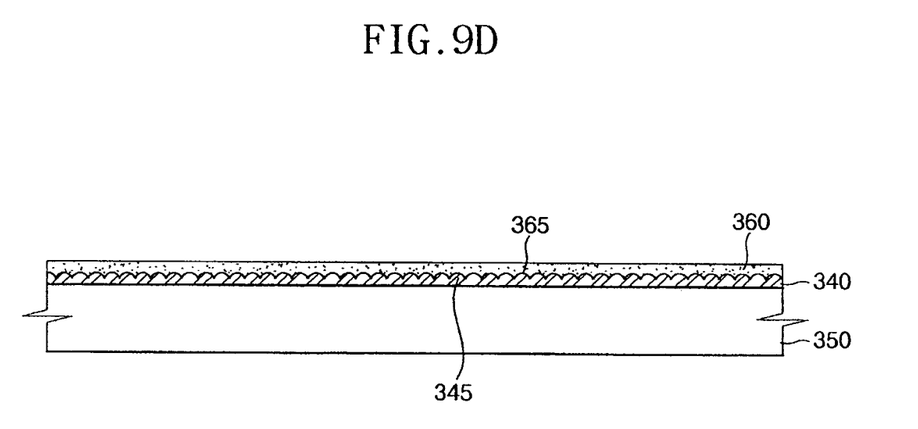

The separated metal layer 340 is attached on a second substrate 350 as shown in FIG. 9D and a synthetic resin layer 360 is coated over the second pattern 345 of the metal layer 340. In this exemplary embodiment, the synthetic resin layer 360 is preferably coated over the second pattern 345 without a void space between the synthetic resin layer 360 and the second pattern 345 of the metal layer 340.

By coating the synthetic resin layer 360 over the second pattern 345 of the metal layer 340, a third pattern 365 is formed on the synthetic resin layer 360. The third pattern 365 has a reversed shape with respect to the light diffusing pattern 135 and is named as a transfer pattern hereinafter.

Figure 9E:
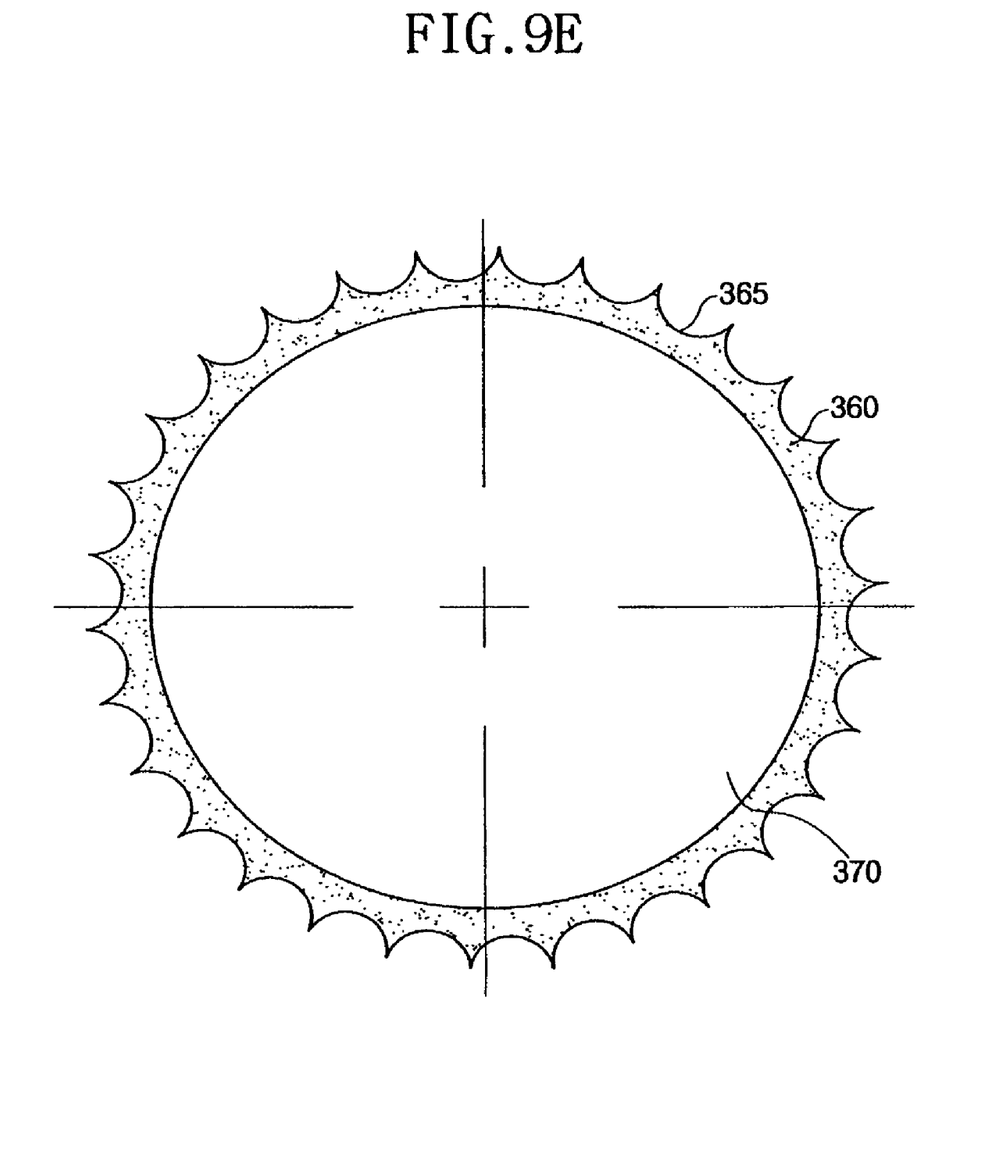

Referring to FIG. 9E, the synthetic resin layer 360, on which the transfer pattern 365 is formed, is attached along an outer surface of the first roller 370. The light diffusing pattern 135 of the first resin layer 130 according to the exemplary embodiment of the present invention is formed by using the first roller 370 having the transfer pattern 365.

Figure 10:
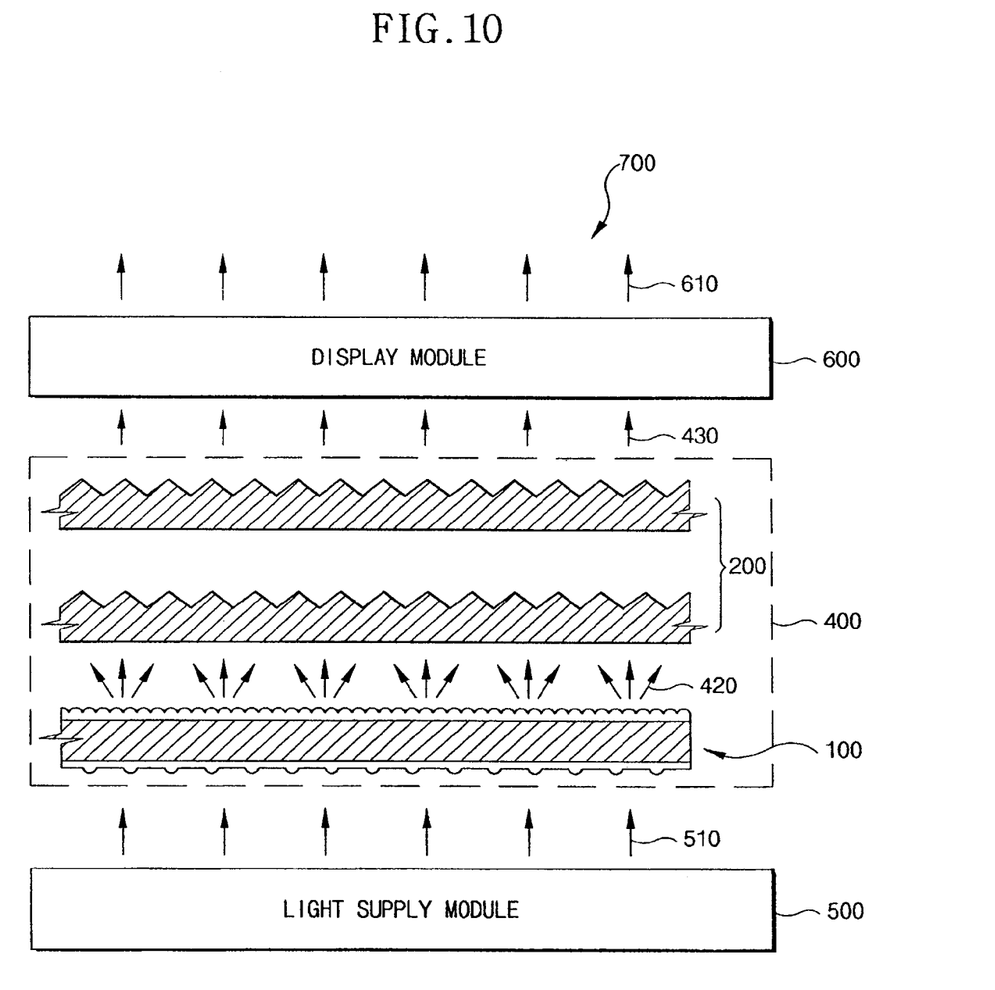
FIG. 10 is a schematic view showing an LCD apparatus according to an exemplary embodiment of the present invention.

FIG. 10 is a schematic view showing an LCD apparatus according to an exemplary embodiment of the present invention.

Referring to FIG. 10, an LCD apparatus 700 includes a light supply module 500, a light adjusting module 400 and a display module 600.

The light supply module 500 includes at least one CCFL (Cold Cathode Fluorescent Lamp) so as to emit the first light 510 needed to display the image. The first light 510 emitted from the light supply module 500 is supplied to the light adjusting module 400.

The light adjusting module 400 includes at least two optical members 100 and 200.

In this exemplary embodiment, the light adjusting module 400 includes a diffusing sheet 100 and a prism sheet 200. The diffusing sheet 100 changes a brightness distribution of the first light 510 so as to emit the second light 420 having a uniform brightness distribution. The prism sheet 200 receives the second light 420 provided from the diffusing sheet 100 and changes directions of the second light 420 so as to emit a third light 430. The diffusing sheet 100 has a same structure as the optical sheet (see FIG. 4) and is fabricated through a same process as the optical sheet (see FIGS. 7A to 7D), so a method of fabricating the diffusing sheet 100 will be omitted in detail.

The display module 600 receives the third light 430 provided from the prism sheet 200 and emits an image light 610 having image information.

In this exemplary embodiment, the display module 600 is an LCD panel that displays the image information using a liquid crystal. The LCD panel may have various shapes so as to display the image information using the liquid crystal.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An optical member comprising:
   a base body having a light incident surface for receiving a first light and a light emitting surface for emitting the first light;
   a light diffusing layer including a first resin layer making direct contact with the light emitting surface and a light diffusing pattern disposed on the first resin layer so as to diffuse the first light emitted from the light emitting surface, the light diffusing pattern having a substantially hemispherical shape;
   a second resin layer disposed on the light incident surface; and
   a layer having a protrusion disposed on the second resin layer so as to prevent the second resin layer from making contact with an adjacent member.

2. The optical member of claim 1, wherein the base body is heat-treated so as to prevent wrinkling of the base body.

3. The optical member of claim 2, wherein a thermal expansion ratio of the base body while the base body is heat-treated is identical to a thermal contraction ratio of the base body while the base body is cooled.

4. The optical member of claim 1, wherein the first resin layer comprises an ultraviolet-curable material.

5. The optical member of claim 1, wherein the base body comprises a thermal expansion ratio and a thermal contraction ratio identical to those of the first resin layer.

6. The optical member of claim 1, wherein the second resin layer comprises an ultraviolet-curable material.

7. The optical member of claim 1, wherein the base body comprises a thermal expansion ratio and a thermal contraction ratio identical to those of the second resin layer.

8. An LCD apparatus comprising:
   a light supplying module for generating a first light;
   an optical member comprising:
   a base body having a light incident surface for receiving the first light and a light emitting surface for emitting the first light, the base body being substantially free of particles; and
   a light diffusing layer having a first resin layer disposed on the light emitting surface and a light diffusing pattern disposed on the first resin layer so as to diffuse the first light emitted from the light emitting surface and to emit a second light, the light diffusing pattern having a substantially hemispherical shape, wherein the light diffusing layer is substantially free of particles and makes direct contact with the base body; and
   an LCD panel displaying an image using the second light.

9. The LCD apparatus of claim 8, wherein the base body is heat-treated so as to prevent wrinkling of the base body.

10. The LCD apparatus of claim 9, wherein a thermal expansion ratio of the base body while the base body is heat-treated is identical to a thennal contraction ratio of the base body while the base body is cooled.

11. The LCD apparatus of claim 8, wherein the first resin layer comprises an ultraviolet-curable material.

12. The LCD apparatus of claim 8, wherein the base body comprises a thermal expansion ratio and a thermal contraction ratio identical to those of the first resin layer.

13. The LCD apparatus of claim 8, wherein the optical member further comprises a second resin layer disposed on the light incident surface and a layer having a plurality of protrusions disposed on the second resin layer so as to prevent the second resin layer from making contact with an adjacent member.

14. The LCD apparatus of claim 13, wherein the second resin layer comprises an ultraviolet-curable material.

15. The LCD apparatus of claim 13, wherein the base body comprises a thermal expansion ratio and a thermal contraction ratio identical to those of the second resin layer.

16. The LCD apparatus of claim 13, wherein the protrusions of the protrusion pattern are separated from each other.

* * * * *